United States Patent Office 3,010,827
Patented Nov. 28, 1961

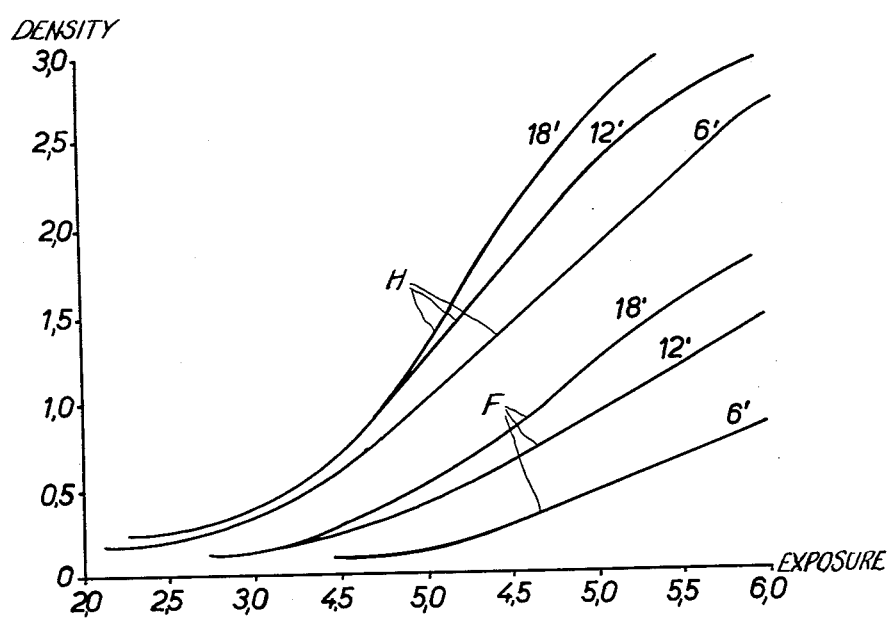

3,010,827
PHOTOGRAPHIC DEVELOPER
Willibald Pelz, Opladen, Lothar Burgardt, Munich, and Ottmar Wahl, Opladen, Germany, assignors to Agfa Aktiengesellschaft, Leverkusen, Germany, a corporation of Germany
Filed Dec. 11, 1957, Ser. No. 702,011
Claims priority, application Germany Dec. 22, 1956
10 Claims. (Cl. 96—66)

The present invention relates to new photographic developing substances for silver salt emulsion layers.

With the exception of a few inorganic developing substances, the substances so far used as photographic developers have been exclusively those which belong to the class of aromatic compounds which are substituted by hydroxyl and/or amino groups. In such use, at least two of these functional groups must be present and must be in the o- or p-position relatively to one another. Recently, compounds which contain a heterocyclic nucleus with these functional —OH or amino groups as substituents have been acquiring an ever increasing practical value. The 1-aryl-3-alkyl-4-amino-5-pyrazolones referred to in the German patent specification No. 646,516 are developing compounds which belong to this class of heterocyclic developers. Owing to their low development intensity, their relatively high instability in aqueous alkali solutions and their strong tendency to cause fogging, these 3-alkyl-4-amino-5-pyrazolones have not been used in practice.

German Patent 955,025 proposes the use as developing substances of 4-amino-5-pyrazolones which contain a carboxyl group or substituted carboxyl group in the 3-position. These pyrazolones are characterized by their greater development intensity and by their low tendency to cause fogging, as well as higher sensitivity and stability of their solutions in aqueous alkalies.

It has now been found that surprisingly 4-amino-5-pyrazolones which are not substituted in the 3-position and which are of the tautomeric formulae:

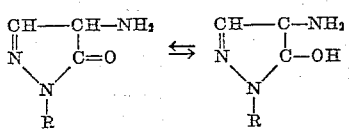

wherein R is a hydrogen atom, a substituted or unsubstituted alkyl, such as methyl, ethyl, propyl, butyl, or cyanethyl; aryl, such as phenyl or phenyl which is substituted such as by an alkyl, alkoxy, carboxy, sulfonic acid group or a halogen atom; aralkyl, such as benzyl; cycloalkyl such as cyclohexyl, or a heterocyclic radical are superior to the compounds substituted in the 3-position by carboxyl groups in a number of important respects, particularly in properties which are important for practical use, in particular higher sensitivity and steeper gradation of the silver images obtained as compared with those obtained using the compounds substituted by carboxyl groups, while having equally good stability and a lower tendency to cause fogging. These substances are generally very soluble in water and alkalies, which is of great importance, particularly in the production of concentrated aqueous solutions which are marketed in a made-up condition.

These developing substances are particularly suitable for the purposes in which great sensitivity and/or higher gamma values are necessary. Owing to the high sensitivity of these substances, developers containing them can be used as negative developers. Because of the steep gradation obtainable, developers containing these substances are particularly suitable as developers for X-ray films and phototechnical materials with which high gamma values are important.

The developing substances can be used alone or together with one or more other known organic developing substances. Suitable known organic developing substances are for instance such which correspond to the general formulae:

(I) 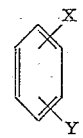

in which X and Y stand for substituents selected from the group consisting of OH and N.R'R", R' and R" being hydrogen, alkyl, substituted alkyl such as $CH_2COOH$ or $CH_2.CH_2.CH_2.SO_3H$, phenyl or substituted phenyl, such as phenylsulfonic acid, said substituents OH and N.R'R" standing in ortho or para position to each other, (II) 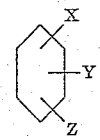

in which formula X and Y have the same meaning as above, Z stands for the same substituents as X or for any other organic substituent such as R', alkoxy, as for instance —OCH COOH, halogen, such as chlorine or bromine, carboxy or sulfonic acid groups, said substituents X, Y and Z standing in 1, 2 and 4 positions, (III) 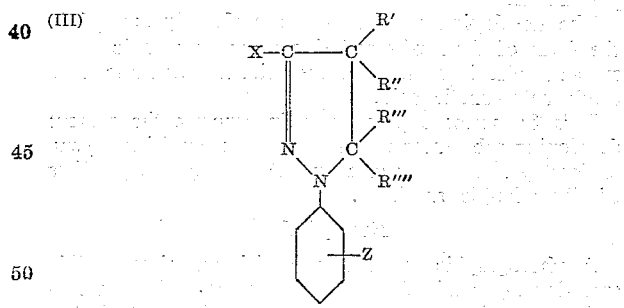

in which X, R', R" have the same meaning as above, and R'" and R"" have the same meaning as R' and R", Z standing for a substituent denoted above with X and R, or for alkoxy, halogen, or a carboxy or sulfonic acid group, it being possible to introduce at least one further substituent of the aforementioned type in said nucleus.

Such components are for instance disclosed in British patent specifications 757,840, 768,071, 776,322 and in French patent specification 1,126,757.

Such compounds are for example p-aminophenol, p-methyl aminophenol, 3,4-diaminophenol, hydroquinone, 2-aminohydroquinone, pyrocatechol, p-phenylene diamine, glycine, or 1-phenyl-3-pyrazolidone, 3-amino-1-

(p - N - methylaminophenyl) - pyrazoline, 2 - amino - 1- (p-aminophenyl)-pyrazoline, and N-alkyl-6-aminotetrahydroquinolines.

Some of the developing substances according to the invention are characterized in that the silver image developed with developers prepared therewith is given a brown tone.

Furthermore, the developers prepared therewith show a low dependence on pH values, so that developer solutions with very low alkali values, or even neutral developers, can be used. The pH values of the solutions may for instance vary between 6.5 and 12, preferably 6.5 and 10. When the present developing substances are used together with 3-aminopyrazolidines the pH value is preferably adjusted to 6–8. In addition, the developing substances show a small degree of dependence on potassium bromide, which is very valuable, particularly for tank development and machine development, since developers containing these substances still produce good gradations even when potassium bromide accumulates in the developers after they have been used for a relatively long time. The great activity and rapidity of the developers at correct pH values in particular facilitate the use of the developers for technical photographic materials which are developed to steep gradations.

The concentration of the developing substances in the solutions may vary within wide limits, it being preferred to use concentrations of about 0.1–1% for solutions that are used for development and concentrations up to about 30% for solutions which are marketed in a made-up condition and are to be diluted before use. In case that the substances of the present invention are used in combination with known developing substances, the total concentration of these substances may lie within the above limits, it being preferred to use the substances of the present invention in amounts which are not smaller than 10% of the weight of the total developing substances and the known developing substances in concentration of at least 0.01 part per thousand.

The following substances are examples of developing substances according to the invention:

4 - amino - 5-pyrazolone, 1-(p-tolyl)-4-amino-5-pyrazolone, 1-(3'-chlorophenyl)-4-amino-5-pyrazolone, 1-(m-tolyl)-4-amino-5-pyrazolone, 1-(2',5'-dimethylphenyl)-4-amino-5-pyrazolone, 1-(3'-carboxyphenyl)-4-amino-5-pyrazolone, 1-(4'-ethoxyphenyl)-4-amino-5-pyrazolone, 1-(2'-benzthiazolyl)-4-amino-5-pyrazolone, 1-(α-pyridyl)-4-amino-5-pyrazolone, 1-(3'-tetrahydrothiophene dioxide)-4-amino-5-pyrazolone and 1-(ω-cyanoethyl)-4-amino-5-pyrazolone.

The developing substances are preferably applied in the form of their salts with inorganic or organic acids, such as sulfuric acid, sulfurous acid, hydrochloric acid, acetic acid, oxalic acid.

It is furthermore possible to incorporate the present developing substances into silver halide emulsion layers, preferably in amounts of from 0.1 to 5 grams per litre of silver halide emulsion.

Example 1

A photographic material comprising a silver halide emulsion layer suitable for the production of black-and-white silver images such as an "Agfa-Isopan" F film ("Agfa-Isopan" is a registered trademark) is exposed behind a √2-step photometric absorption wedge, developed for 10 minutes at 18° C. in the following developer solutions and fixed with an aqueous solution of sodium thiosulfate in the usual manner.

Developer solution A:
75 g. of sodium sulphite,
5 g. of sodium carbonate,
2.5 g. of potassium bromide,
4 g. of p-methylamino-phenol-sulfate, and water to make up to 1 litre of solution.

The solution has a pH value of 9.55.

Developer solution B: Instead of 4 g. of p-methylamino-phenol sulfate 5.2 g. of 1-phenyl-4-amino-5-pyrazolone sulfate are used and the pH value is adjusted to 9.55 with 10% sodium hydroxide solution.

Using developer A, a gamma value of 0.70 is obtained with a fog density of 0.065; using developer B, a gamma value of 0.95 is obtained with a fog density of 0.090. A gamma value of 0.7 is obtained after 8 minutes with developer A, and after 4 minutes with developer B.

The 1-phenyl-4-amino-5-pyrazolone sulfate can be obtained in the following manner:

1-phenyl-5-pyrazolone is produced in accordance with Ber. der Deutschen Chem. Ges., volume 28, page 36.

25 g. of this pyrazolone are dissolved in 60 cc. of 10% sodium hydroxide solution, 10.5 g. of sodium nitrite are added and the resulting mixture is introduced dropwise at 0–5° C. into 160 cc. of 10% sulphuric acid. The resulting mixture is stirred for another 30 minutes and filtered with suction, and the residue is washed with 100 cc. of iced water.

24. g. of the nitroso compound obtained are reduced in 180 cc. of methanol with Raney nickel at a hydrogen pressure of 50 atm. and the hydrogenated solution is treated with 50% sulphuric acid, the precipitate obtained being filtered off with suction and washed with alcohol-ether (1:1). M.P.=170° C. under decomposition.

In the same manner, a nitroso group can be introduced into the following compounds, which are then reduced to the 4-amino compound:

1-(2'-chlorophenyl)-5-pyrazolone, M.P. 190–193° C.
1-(3'-chlorophenyl)-5-pyrazolone, M.P. 121–123° C.
1-(m-tolyl)-5-pyrazolone, M.P. 103–104° C.
1 - (2',5' - dimethyl - phenyl) - 5 - pyrazolone, M.P. 160–161° C.
1-(3'-carboxyphenyl)-5-pyrazolone.
1-(4'-ethoxyphenyl)-5-pyrazolone.
1-(4'-chlorophenyl)-5-pyrazolone.

Example 2

"Agfa-Isopan" F film material is exposed behind a √2-step photometric absorption wedge, developed for 1 minute in the following developer solutions and fixed in the usual way.

(1) Developer solution A as in Example 1.
(2) Developer solution C: instead of 4 g. of p-methyl-amino-phenol-sulfate of the developer mixture A, 6.5 g. of 1-(α-pyridyl)-4-amino-5-pyrazolone hydrochloride are used.

The wedge developed in developer A shows 8 steps, while that developed in developer C shows 12 steps.

The 1-(α-pyridyl)-4-amino-5-pyrazolone can be prepared as follows:

20 g. of 2-hydrazino-pyridine, prepared according to J. Chem. Soc. 1949, page 2548, are introduced into 40 g. of ethoxy-methylene malonic ester, the temperature being kept below 40° C., and the resulting mixture is heated for 10 minutes to 70–75° C. On cooling, the α-pyridyl-hydrazone of the formyl malonic ester crystallizes out, M.P.=93° C. (after being dissolved in and recrystallized from 50% methanol).

14 g. of this product are suspended in 125 cc. of water and heated to 80° C., 1.5 g. of sodium carbonate are added and the resulting mixture is heated to boiling point for 2 hours, whereupon active carbon is added and the mixture is filtered while hot. After cooling, 10% sulphuric acid is added until the Congo reaction is acid and then the resulting mixture is filtered with suction; M.P. of the 1-(α-pyridyl)-4-carbethoxy-5-pyrazolone thus formed is 146.5 to 147° C.

22 g. of this product are heated for 30 minutes to boiling with 200 cc. of 10% sulphuric acid, adjusted after cooling to a pH value of 5 with 10% sodium carbonate solution and the pyrazolone which is formed is filtered off with suction.

16 g. of the pyrazolone are dissolved in 100 cc. of ethanol. A solution of 5 g. of potassium hydroxide in 20 cc. of methanol is added and, while stirring, 12 g. of benzene sulphonic acid azide in 25 cc. of ethanol are added over a period of 15 minutes. Stirring is continued for 30 minutes and the product which is formed, which has the formula:

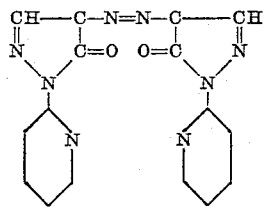

is filtered off with suction and washed with ethanol. M.P.=175–176° C.

10 g. of the azo compound are suspended in 15 cc. of ethanol, 50 cc. of concentrated sulphuric acid are added and reduction is accomplished by introducing tin sludge until the reaction mixture is light yellow. This mixture is filtered with suction and the residue is dissolved in and recrystallized from 10% hydrochloric acid. M.P. of the 1-(α-pyridyl)-4-amino - 5 - pyrazolone hydrochloride is 174–180° C. with brown coloration.

The 1-(2'-benzthiazolyl)-4-amino-5-pyrazolone and the 1-(3'-tetrahydrothiophenyl-dioxide)-4 - aminopyrazolone may be produced and applied in analogous manner.

*Example 3*

"Agfa-Isopan" F film is exposed with a √2 stepped photometric absorption wedge, developed for 3 minutes with the following developer solutions and then fixed, Developer solution D:

1.6 g. of p-methylamino-phenol-sulfate,
25 g. of sodium sulphite,
2.5 g. of sodium carbonate, and
0.3 g. of potassium bromide, made up with water to 200 cc. of solution.

Developer solution E:

Instead of the 1.6 g. of p-methylamino-phenol sulfate, 3.2 g. of 1-(p'-tolyl)-4-amino-5-pyrazolone sulfate are used.

With equal sensitivity, a gamma of 0.87 is obtained with developer D and a gamma of 1.32 with developer E.

When the silver image obtained by developer E is bleached out with Farmer's reducer, an intensely orange colored residual image remains.

*Example 4*

An "Isopan" F film is exposed with a √2-stepped photometric absorption wedge, developer in the developer solutions F, G and H for 18 minutes and fixed in the usual manner.

(F) 4.5 g. of p-methylamino-phenol sulfate,
75 g. of anhydrous sodium sulphite,
1 g. of anhydrous sodium carbonate, and
0.3 g. of potassium bromide.

The solution has a pH value of 8.1.

(G) Instead of the p-methylamino-phenol sulfate of the developer mixture F, 7 g. of 1-phenyl-3-carbonamide-4-amino-5-pyrazolone sulfate are used and the solution is brought to a pH value of 8.1.

(H) Instead of the p-methylamino-phenol sulfate in developer mixture F, 7.5 g. of 1-(α-pyridyl)-4-amino-5-pyrazolone-hydrochloride are used and the pH value brought to 8.1.

After a developing period of 6 minutes, the wedge developed with F shows 8 steps, the wedge developed with G shows 11 steps and the wedge developed with H shows 12 steps.

After a development time of 18 minutes, the gamma with F is 0.7, with G is 0.7 and with H is 1.25.

As seen in the single figure of the accompanying drawing, the gamma curves of F and H with development times of 6, 12 and 18 minutes are compared.

*Example 5*

An "Agfa-Isopan" F film is developed for 5 to 6 minutes in a developer solution of the following composition:

7 g. of 1-phenyl-4-aminopyrazolone,
28 cc. of a 10% acetic acid solution,
20 g. of anhydrous sodium sulfite,
0.5 g. of potassium bromide,
0.1 g. of 1-(4'-aminophenyl)-3-amino pyrazolone, 500 cc. of water.

The solution has a pH value of 6.

The silver image obtained after fixing has a gamma value of 0.65.

What we claim is:

1. An aqueous developing solution for silver halide emulsion layers comprising as silver halide developer a 4-amino-5-pyrazolone of the general formula:

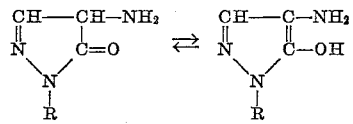

wherein R is a substituent selected from the group consisting of an aryl group of the benzene series, α-pyridyl, 2'-benzthiazolyl, and 3'-tetrathiophenyl-dioxide, said solution being adjusted to a pH value of 6.5–12.

2. The developing solution of claim 1 wherein R is phenyl.

3. An aqueous developing solution for silver halide emulsion layers comprising as silver halide developer a 4-amino-5-pyrazolone of the general formula:

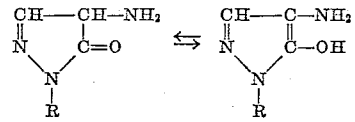

wherein R is a substituent selected from the group consisting of an aryl group of the benzene series, α-pyridyl, 2'-benzthiazolyl, and 3'-tetrathiophenyl-dioxide, said solution being adjusted to a pH value of 6.5–12, and containing sodium sulfite.

4. The developing solution of claim 3 wherein R is phenyl.

5. An aqueous developing solution for silver halide emulsion layers comprising as silver halide developer a 4-amino-5-pyrazolone of the general formula:

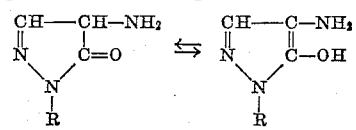

wherein R is a substituent selected from the group consisting of an aryl group of the benzene series, α-pyridyl, 2'-benzthiazolyl, and 3'-tetrathiophenyl-dioxide, said solution being adjusted to a pH value of 6.5–12, and containing a further silver halide developer selected from the group consisting of dihydric phenols, amino-phenols, phenylene diamines, 1-phenyl-3-pyrazolidones, 3-aminopyrazolines and N-alkyl-6-amino-tetrahydroquinolines.

6. The developing solution of claim 5 wherein R is phenyl.

7. A photographic silver halide emulsion layer containing a 4-amino-5-pyrazolone in which the 1-position of the pyrazolone is substituted by a member of the class consisting of an aryl group of the benzene series, α-pyridyl, 2'-benzthiazolyl, and 3'-tetrathiophenyl-dioxide, said solution being adjusted to a pH value of 6.5–12.

8. The silver halide emulsion layer of claim 7 wherein the substituent in the 1-position of the pyrazolone is phenyl.

9. A process for developing a photographic silver halide emulsion, said process comprising subjecting the emulsion to the action of an aqueous solution of an alkaline sulfite and of a 4-amino-5-pyrazolone in which the 1-position of the pyrazolone is substituted by a member of the class consisting of an aryl group of the benzene series, 2'-benzthiazolyl, α-pyridyl and 3'-tetrahydrothiophene dioxide radicals, the solution having a pH between about 6.5 and 12.

10. The process of claim 9 wherein the substituent in the 1-position of the pyrazolone is phenyl.

References Cited in the file of this patent

UNITED STATES PATENTS 853,643     Lumiere    ---------------- May 14, 1907

FOREIGN PATENTS 1,124,976     France    ---------------- July 9, 1956

OTHER REFERENCES

History of Color Photography, Friedman, 1944, pp. 364–366.